United States Patent
Dubrovin et al.

(10) Patent No.: US 8,499,139 B2
(45) Date of Patent: Jul. 30, 2013

(54) AVOIDING STALL IN PROCESSOR PIPELINE UPON READ AFTER WRITE RESOURCE CONFLICT WHEN INTERVENING WRITE PRESENT

(75) Inventors: Leonid Dubrovin, Karney Shomron (IL); Alexander Rabinovitch, Kfar Yona (IL); Hagit Margolin, Yokneam Elit (IL); Noam Abda, Meitar (IL)

(73) Assignee: LSI Corporation, San Jose, CA (US)

( * ) Notice: Subject to any disclaimer, the term of this patent is extended or adjusted under 35 U.S.C. 154(b) by 434 days.

(21) Appl. No.: 12/855,201

(22) Filed: Aug. 12, 2010

(65) Prior Publication Data
US 2012/0042152 A1    Feb. 16, 2012

(51) Int. Cl.
*G06F 9/38*    (2006.01)
(52) U.S. Cl.
USPC .......................................... 712/219; 712/21
(58) Field of Classification Search
None
See application file for complete search history.

(56) References Cited

U.S. PATENT DOCUMENTS

| 5,073,855 A | 12/1991 | Staplin et al. ............... 395/375 |
| 6,470,445 B1 * | 10/2002 | Arnold et al. ............... 712/218 |
| 6,810,475 B1 | 10/2004 | Tardieux ..................... 712/219 |

* cited by examiner

*Primary Examiner* — Kenneth Kim
(74) *Attorney, Agent, or Firm* — Christopher P. Maiorana, PC (57) ABSTRACT

An apparatus having a processor and a circuit is disclosed. The processor generally has a pipeline. The circuit may be configured to (i) detect a first write instruction in the pipeline that writes to a resource, (ii) stall a read instruction in the pipeline where (a) a first read-after-write conflict exists between the first write instruction and the read instruction and (b) no other write instruction to the resource is scheduled between the first write instruction and the read instruction and (iii) not stall the read instruction due to the first read-after-write conflict where a second write instruction to the resource is scheduled between the first write instruction and the read instruction.

20 Claims, 7 Drawing Sheets

| CYCLE | S1 | S2 | S3 | S4 | S5 | S6 | S7 | S8 | S9 | S10 |
|---|---|---|---|---|---|---|---|---|---|---|
| 1 | I4 | I3 | I2 | I1 | | | | | | |
| 2 | | I4 | I3 WRITE | I2 | I1 | | | | | |
| 3 | | | I4 | I3 | I2 | I1 | | | | |
| 4 | | | | I4 READ | I3 | I2 | I1 | | | |
| 5 | | | | | I4 | I3 | I2 | I1 | | |
| 6 | | | | | | I4 | I3 | I2 | I1 WRITE | |
| 7 | | | | | | | I4 | I3 | I2 READ | I1 |

| CYCLE | S1 | S2 | S3 | S4 | S5 | S6 | S7 | S8 | S9 | S10 |
|---|---|---|---|---|---|---|---|---|---|---|
| 1 | I1 | | | | | | | | | |
| 2 | I2 | I1 | | | | | | | | |
| 3 | I3 | I2 | I1 | | | | | | | |
| 4 | | I3 | I2 | I1 | | | | | | |
| 5 | | | I3 | I2 | I1 WRITE | | | | | |
| 6 | | | I3 READ | | I2 | I1 | | | | |

STALL I3 READ

FIG. 1

| CYCLE | S1 | S2 | S3 | S4 | S5 | S6 | S7 | S8 | S9 | S10 | |
|---|---|---|---|---|---|---|---|---|---|---|---|
| 1 | I4 | I3 | I2 | I1 | | | | | | | |
| 2 | | I4 | I3 WRITE | I2 | I1 | | | | | | |
| 3 | | | | I3 | I2 | I1 | | | | | |
| 4 | | | | I4 | I3 | I2 | I1 | | | | STALL I4 READ |
| 5 | | | | I4 | I3 | I2 | I1 | I1 | | | STALL I4 READ |
| 6 | | | | I4 | I3 | I2 | I1 | I2 | I1 WRITE | | STALL I4 READ |
| 7 | | | | I4 READ | | | | I3 | I2 READ | I1 | |

| CYCLE | S1 | S2 | S3 | S4 | S5 | S6 | S7 | S8 | S9 | S10 |
|---|---|---|---|---|---|---|---|---|---|---|
| 1 | I4 | I3 | I2 | I1 | | | | | | |
| 2 | | I4 | I3 WRITE | I2 | I1 | | | | | |
| 3 | | | I4 | I3 | I2 | I1 | | | | |
| 4 | | | | I4 READ | I3 | I2 | I1 | | | |
| 5 | | | | | I4 | I3 | I2 | I1 | | |
| 6 | | | | | | I4 | I3 | I2 | I1 WRITE | |
| 7 | | | | | | | I4 | I3 | I2 READ | I1 |

| CYCLE | S1 | S2 | S3 | S4 | S5 | S6 | S7 | S8 | S9 | S10 |
|---|---|---|---|---|---|---|---|---|---|---|
| 1 | I1 | | | | | | | | | |
| 2 | I2 | I1 | | | | | | | | |
| 3 | NOP | I2 | I1 | | | | | | | |
| 4 | I3 | NOP | I2 | I1 | | | | | | |
| 5 | | I3 | NOP | I2 | I1 WRITE | | | | | |
| 6 | | | I3 READ | NOP | I2 | I1 | | | | |

AVOIDING STALL IN PROCESSOR PIPELINE UPON READ AFTER WRITE RESOURCE CONFLICT WHEN INTERVENING WRITE PRESENT

FIELD OF THE INVENTION

The present invention relates to pipelined processors generally and, more particularly, to a method and/or apparatus for implementing an elimination of read-after-write resource conflicts in a pipeline of a processor.

BACKGROUND OF THE INVENTION

A read-after-write conflict occurs in a pipelined processor when an instruction writes to a register or a status bit, and a succeeding instruction attempts to read from the register or status bit before the register or the status bit has actually been updated. Consider the following examples based on a pipelined with 10 stages and the StarCore assembler language. A typical read-after-write conflict occurs where an instruction I2 attempts to read from a register R1 before an instruction I1 writes to the register R1:

I1: MOVE, L D1, R1; Write R1 at stage S5
I2: MOVE, L (R1), R2; Read R1 at stage S3

When the instruction I2 reaches stage S3 and is ready to read the register R1, the instruction I1 is only located at stage S4. The register R1 does not become available to read until a cycle after the instruction I1 is executed and the data D1 is written to the register R1. Therefore an interlock mechanism of the processor will stall the instruction I2 for two cycles until the data D1 is in the register R1 and available to read.

Figure 1:
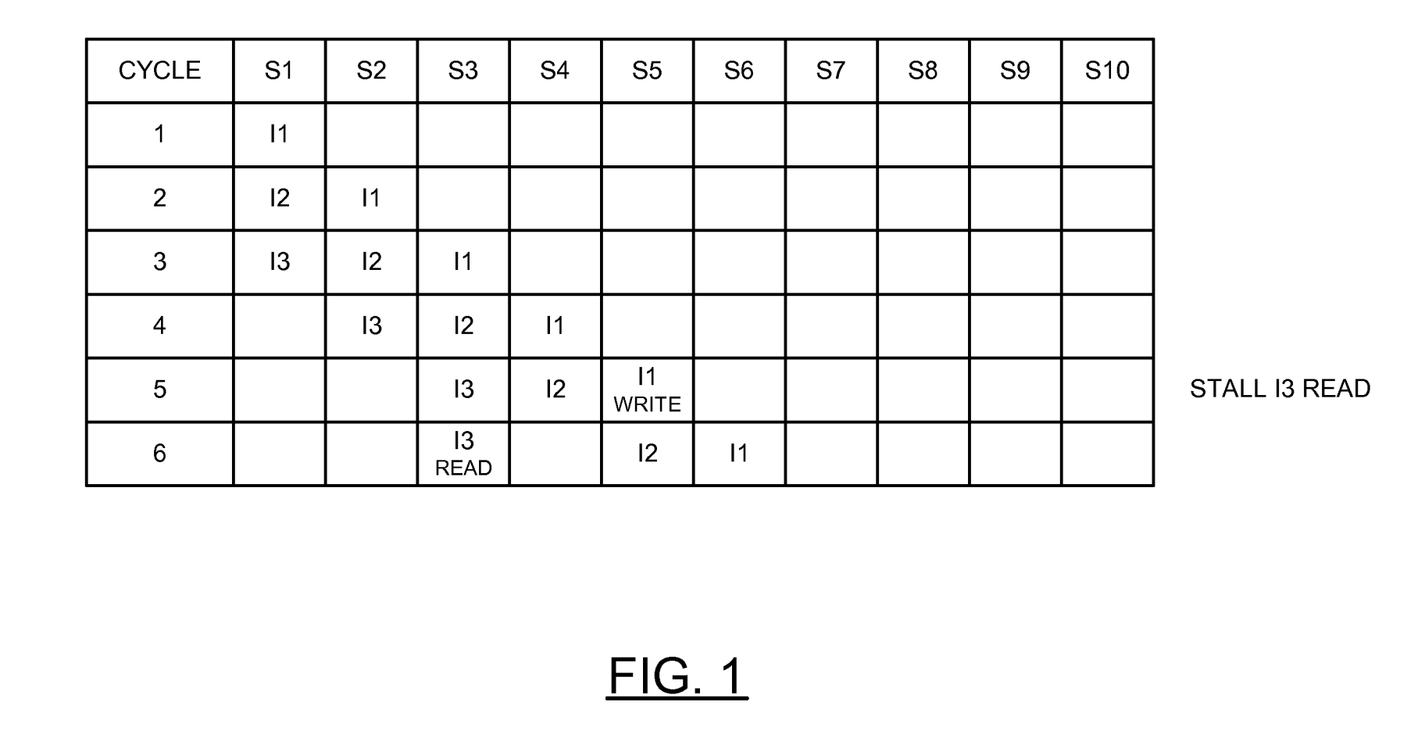
FIG. 1 is a diagram illustrating a conventional single cycle stall.

Referring to FIG. 1, a diagram illustrating a conventional single cycle stall is shown. In the example, the instructions in conflict are a write instruction I1 (i.e., MOVE,L D1,R1) and a read instruction I3 (i.e., MOVE,L (R1),R2). An additional instruction I2 (i.e., ADD D4,D5) exists between the instructions I1 and I2. The instructions I1 to I3 progress through the early stages of the pipeline as normal in cycles 1 through 4. In cycle 5, the instruction I3 reaches stage S3 and is ready to read the register R1 and the instruction I1 writes to the register R1 from stage S5. Since the register R1 will not have the data D1 calculated by the instruction I1 stored within until a cycle after the write by the instruction I1, execution of the instruction I3 is delayed until cycle 6 before reading from the register R1. Therefore, the interlock mechanism generates a single cycle stall of the instruction I3. The number of cycles for which a read instruction is stalled depends on what stage the register is being read from, at what stage the register is being written to, and the distance between the two instructions that cause the conflict.

Figure 2:
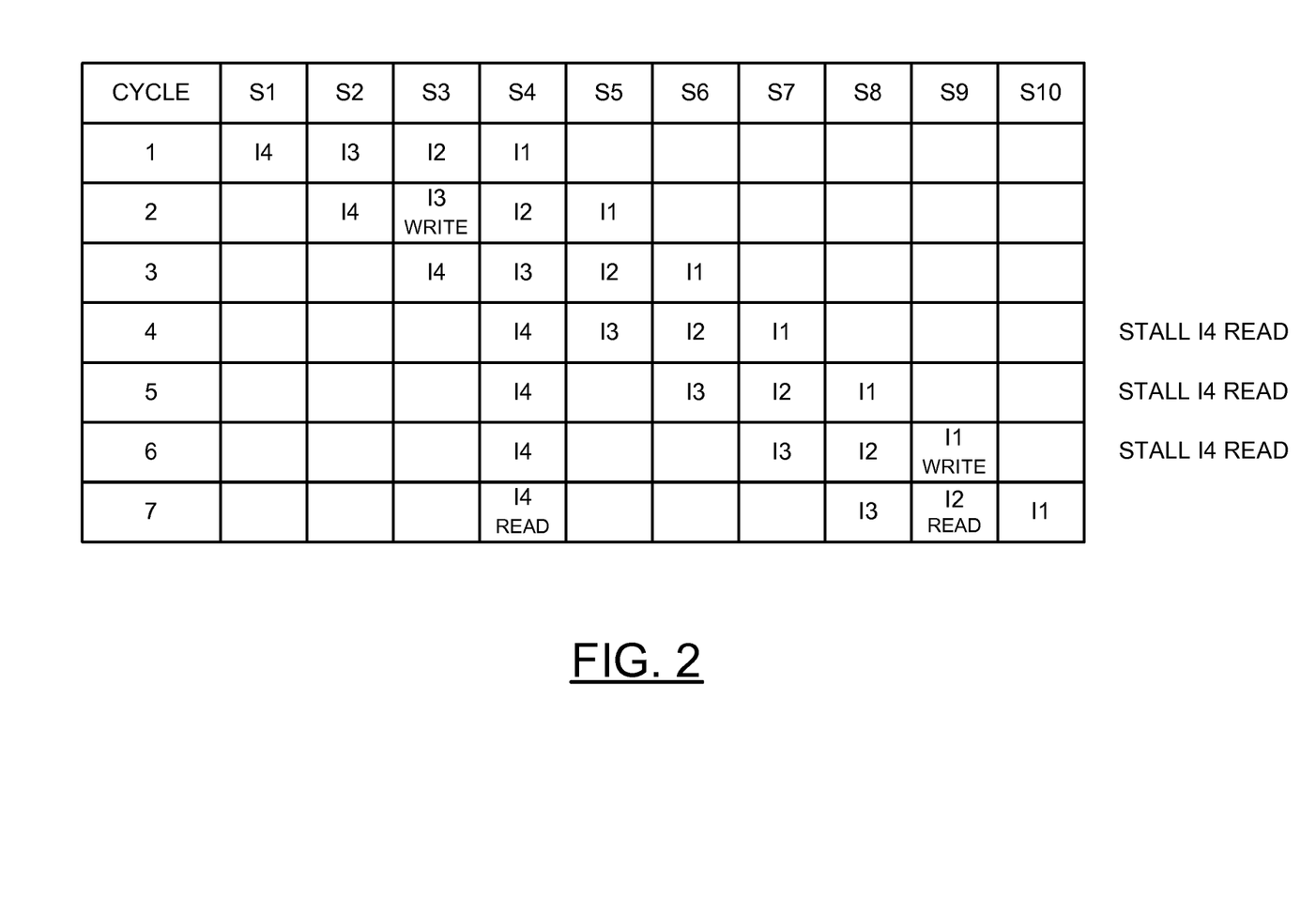
FIG. 2 is a diagram illustrating a conventional three cycle stall.

Referring to FIG. 2, a diagram illustrating a conventional three cycle stall is shown. In the example, the instructions in conflict are a write instruction I1 (i.e., CMPEQ D0,D1) to a bit T and a read instruction I4 (i.e., IFT ADDA R6,R7) of the bit T. Another write instruction I3 (i.e., CMPEQA R0,R1) that writes to the bit T resides between the instructions I1 and I4. An instruction I2 (i.e., IFT ADD D6,D7,D8) that reads the bit T is located between the instructions I1 and I3.

In cycle 4, the instruction I4 reaches stage S4 and the instruction I1 reaches stage S7. Since the instruction I1 does not write until stage S9 in cycle 6, a three-cycle stall is generated by the interlock mechanism. The three-cycle stall delays the instruction I4 from reading the bit T until cycle 7. The interlock mechanism does not account for the instruction I3 writing to the register R1 from stage S3 in cycle 2. The interlock mechanism generates the three-cycle stall regardless of the presence or absence of the write instruction I3.

SUMMARY OF THE INVENTION

The present invention concerns an apparatus having a processor and a circuit. The processor generally has a pipeline. The circuit may be configured to (i) detect a first write instruction in the pipeline that writes to a resource, (ii) stall a read instruction in the pipeline where (a) a first read-after-write conflict exists between the first write instruction and the read instruction and (b) no other write instruction to the resource is scheduled between the first write instruction and the read instruction and (iii) not stall the read instruction due to the first read-after-write conflict where a second write instruction to the resource is scheduled between the first write instruction and the read instruction.

The objects, features and advantages of the present invention include providing a method and/or apparatus for implementing an elimination of read-after-write resource conflicts in a pipeline of a processor that may (i) take into account intermediate instructions between conflicting instructions, (ii) influence access to resources, (iii) influence an update stage of the resources, (iv) eliminate read-after-write conflicts in certain cases, (v) reduce a number of stalls in a pipelined processor and/or (vi) improve performance of a pipelined processor.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

An interlocked pipeline of a processor generally detects and solves resource conflicts. Resource conflicts may happen in a processor when a resource (e.g., a register or a status bit) is read to and written from different pipeline stages. A read-after-write conflict may occur when a particular stage writes to a resource and, an earlier stage attempts to read from the same resource in accordance with a following instruction or instructions. In general, (i) a distance (e.g., number of instructions) between the read instruction and the write instruction and (ii) a distance (e.g., number of stages or cycles) between the writing stage and the reading stage in the pipeline generally define a number of interlock (e.g., stall) cycles that resolve the read-after-write conflict. Some embodiments of the present invention may omit an anticipated read-after-write conflict when an additional write to the resource occurs between the read after the write. Therefore, the number of inserted stalls may be reduced. If the additional write does not cause another read-after-write conflict, the stalls may be eliminated.

Figure 3:
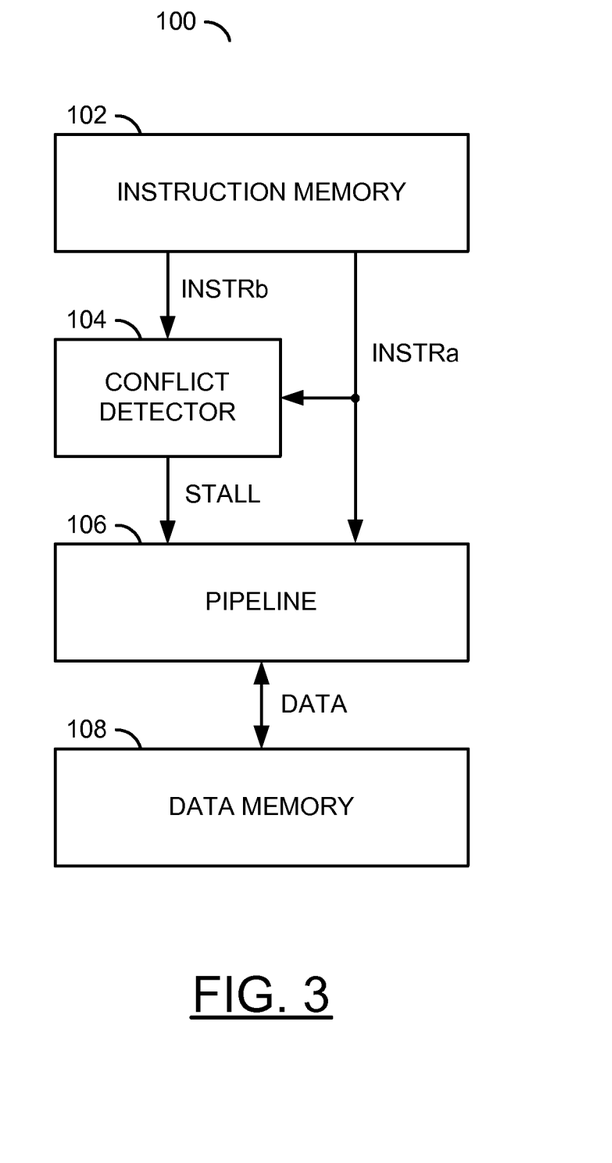
FIG. 3 is a block diagram of a device in accordance with a preferred embodiment of the present invention.

Referring to FIG. 3, a block diagram of a device 100 is shown in accordance with a preferred embodiment of the present invention. The device (or apparatus) 100 may implement a pipelined processor. In some embodiments, the device 100 may implement an interlocked pipelined processor. The device 100 generally comprises a circuit (or module) 102, a circuit (or module) 104, a circuit (or module) 106 and a circuit (or module) 108. The circuits 102 to 108 may represent modules and/or blocks that may be implemented as hardware, firmware, software, a combination of hardware, firmware and/or software, or other implementations.

A signal (e.g., INSTRa) may be generated by the circuit 102 and presented to both the circuit 104 and the circuit 106. The circuit 102 may also generate a signal (e.g., INSTRb) that is received by the circuit 104. A signal (e.g., STALL) may be created by the circuit 104 and transferred to the circuit 106. The circuit 106 and the circuit 108 may exchange a signal (e.g., DATA).

The circuit 102 may implement an instruction memory circuit. The circuit 102 is generally operational to store instructions that are executed by the device 100. A sequence of instructions may be presented to the circuits 104 and 106 in the signal INSTRa. Some instructions may be presented in the signal INSTRb to the circuit 104.

The circuit 104 generally implements a conflict detector circuit. The circuit 104 is generally operational to search for and detect resource conflicts among the instructions currently being executed and/or about to be executed. As instructions are loaded from the circuit 102 into the circuit 106, a copy of each current instruction may be examined by the circuit 104. Each current instruction may be compared against one or more other instructions received in the signal INSTRb. The other instructions are generally scheduled to follow the current instruction. In some embodiments, the circuit 104 may be operational to detect read-after-write conflicts among the instructions. In certain cases, the read-after-write conflicts may be anticipated and later canceled as an intervening write may negate the conflict. For each conflict detected, the circuit 104 may generate corresponding information in the signal STALL. The information generally informs the circuit 106 how to overcome the conflict. For example, a read-after-write conflict may be overcome by stalling the read instruction until the written data has been updated and is ready to be read.

The circuit 106 may implement a pipelined processor circuit having multiple stages. The circuit 106 is generally operational to process multiple instructions simultaneously, generally a different instruction in each of the stages. The instructions may be received from the circuit 102 through the signal INSTRa. Data generated and/or read by the executing instructions may be exchanged with the circuit 108 via the signal DATA. The circuit 106 may be operational to deal with resource conflicts based on the information received in the signal STALL. For example, the circuit 106 may stall a resource read operation in a particular stage for one or more cycles. The stalls generally allow a resource write operation sufficient time to write the data into the resource from a different pipeline stage of the circuit 106.

The circuit 108 may implement a data memory circuit. The circuit 108 is generally operational to buffer data for the circuit 106 via the signal DATA. The circuit 108 may be divided into individual bits, registers, blocks and/or pages. Data written to the circuit 108 from the circuit 106 may be available to the circuit 106 a clock cycle after being written. In some designs, part to all of the circuit 108 may be integrated into the circuit 106.

Figure 4:
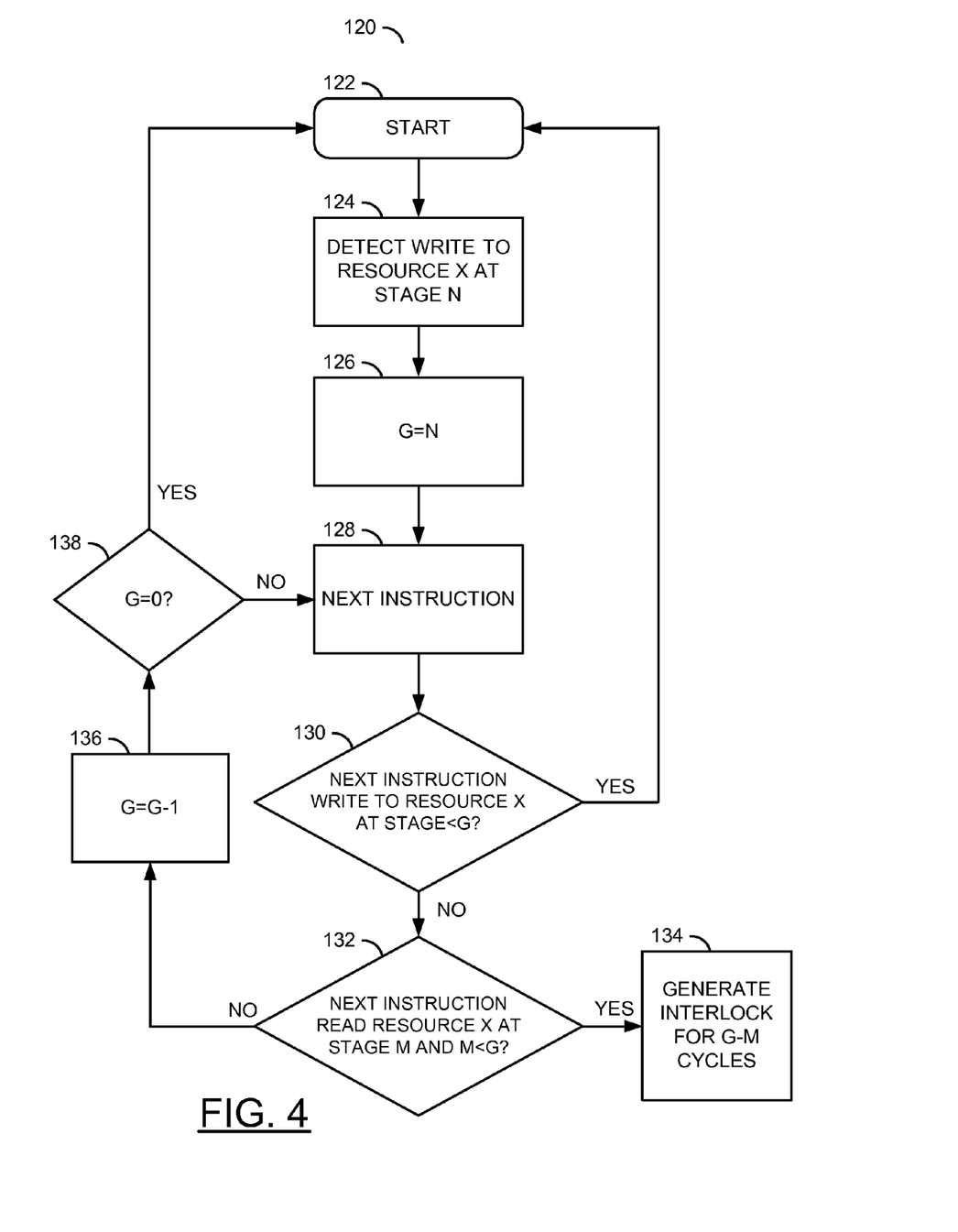
FIG. 4 is a flow diagram of an example method for conflict detection.

Referring to FIG. 4, a flow diagram of an example method 120 for conflict detection is shown. The method (or process) 120 generally comprises a step (or block) 122, a step (or block) 124, a step (or block) 126, a step (or block) 128, a step (or block) 130, a step (or block) 132, a step (or block) 134, a step (or block) 136 and a step (or block) 138. The method 120 may be implemented by the circuit 104. The steps 122 to 138 may represent modules and/or blocks that may be implemented as hardware, firmware, software, a combination of hardware, firmware and/or software, or other implementations.

The method 120 generally starts at the step 122 waiting for an instruction. In the step 124, the circuit 104 may detect a current write instruction in the signal INSTRa. The current write instruction generally writes to a resource (e.g., resource X) at a particular stage (e.g., stage N) of the circuit 106. Stage N may be any stage in the pipeline. The current write instruction may be in a sequence of instructions stored in the circuit 102. Upon detection of the current write instruction, the circuit 104 may set a counter variable (e.g., G) in the step 126 to match the stage number N from which the write takes place (e.g., G=N). The current write instruction may or may not be the beginning of a read-after-write conflict, depending on the subsequently-scheduled instructions in the sequence.

The circuit 104 may look at the next instruction in the sequence in the step 128. The next instruction may be obtained from the circuit 102 via the signal INSTRb. A check may be performed in the step 130 to see if the next instruction is another write instruction. If the next instruction is (i) not a write to the resource X and/or (ii) not at a stage earlier than stage G (e.g., the NO block of step 130), the method 120 may proceed to step 132. In the step 132, if the next instruction is all of (i) a read instruction (ii) from resource X at a stage (e.g., stage M) and (iii) stage M is earlier in the pipeline than stage G (e.g., the YES branch of step 132), the circuit 104 generally concludes that a read-after-write conflict exists between the current write instruction and the read instruction. The stage M may be any stage in the pipeline.

In response to detecting the read-after-write conflict, the circuit 104 may assert an interlock in step 134 for a total of G-M cycles. The circuit 104 may convey the interlock assertion to the circuit 106 in the signal STALL. The signal STALL generally commands the circuit 106 to stall the read instruction at the stage M for a calculated number of cycles. The stall may delay the read instruction long enough to allow the current write instruction to load (write, transfer, place) the data into the circuit 108 from stage N and the data to become available to read.

If the next instruction is (i) not a read instruction and/or (ii) not a read from stage M (e.g., the NO branch of step 132), the circuit 104 may decrement the counter variable G (e.g., G=G-1) in the step 136. A check may be performed in the step 138 to determine if more instructions should be examined or not. If the variable G has not reached zero (e.g., the NO branch of step 138), more instructions should be examined. In the step 128, the circuit 104 may obtain the next scheduled instruction from the circuit 102 via the signal. INSTRb. Thereafter, the method 120 may continue with the step 130. If the counter variable G has reached zero (e.g., the YES branch in the step 138), the circuit 104 may conclude that no read-after-write conflict exists for the current write instruction at the stage N. The method 120 thus returns to the step 122 and waits for another instruction in the signal INSTRa.

Returning to the step 130, if the next instruction is (i) a subsequent write instruction to the resource X and (ii) occurs at an earlier stage than stage G (e.g., the YES branch of step 130), the circuit 104 may conclude that the current write instruction does not cause a read-after-write conflict. Therefore, the method 120 may return to the step 122 and wait for another instruction in the signal INSTRa. When the subsequent write instruction from step 130 appears in the signal INSTRa, the circuit 104 may being another a read-after-write conflict test based on the subsequent write instruction.

Circuit 104 may run the method 120 independently for every executed instruction. The method 120 generally accounts for one or more write instructions between the current write instruction and a later read instruction. Consequently, a potential read-after-write conflict between the current write instruction and the later read instruction may be cancelled by an intermediate (e.g., subsequent) write instruction. Cancellation of the potential read-after-write resource conflict generally reduces the number of stalls performed by the circuit 106. Therefore, a performance of the processor 106 may be increased. In some cases, however, a new read-after-write conflict may be detected between the intermediate write instruction and the later read instruction.

By considering each executed instruction independently, the method 120 may account for nested read-after-write conflicts. For example, a read-after-write conflict for the resource X may have nested within a read-after-write conflict for another resource (e.g., resource Y). In particular, a write to the resource Y may take place after the write to the resource X. A read from the resource Y may occur before the read from the resource X. When the write to resource Y is considered at the step 130, the NO branch may be selected as the write is not to the resource X. When the read from resource Y is considered at the step 132, the NO branch may be selected as the read is not from the resource X. Therefore, the read-after-write conflict for resource Y may have no impact of the read-after-write conflict for resource X.

The method 120 may produce the same results as shown in FIG. 1 where a true read-after-write resource conflict exists. By way of example, consider the situation of FIG. 1 where the instruction I1 writes to a resource X from stage S5 and the instruction I3 reads the resource X from earlier stage S3. As the instruction I1 is transferred from the circuit 102 to the circuit 106, the circuit 104 may detect the write to resource X from stage S5 per step 124 (G=N=5). The instruction I2 may be obtained by the circuit 104 in step 128. Steps 130 and 132 may determine that instructions I1 and I2 do not cause a read-after-write conflict.

The counter variable G may be decremented from 5 to 4 in step 136 and instruction I3 obtained in step 128. The circuit 104 may determine in the step 132 that the instructions I1 and I3 cause a read-after-write conflict. In cycle 5, the instruction may write to the resource X from stage S5 and the circuit 104 may generate a stall in step 134 that prevents instruction I3 from reading the resource X until cycle 6.

Figure 5:
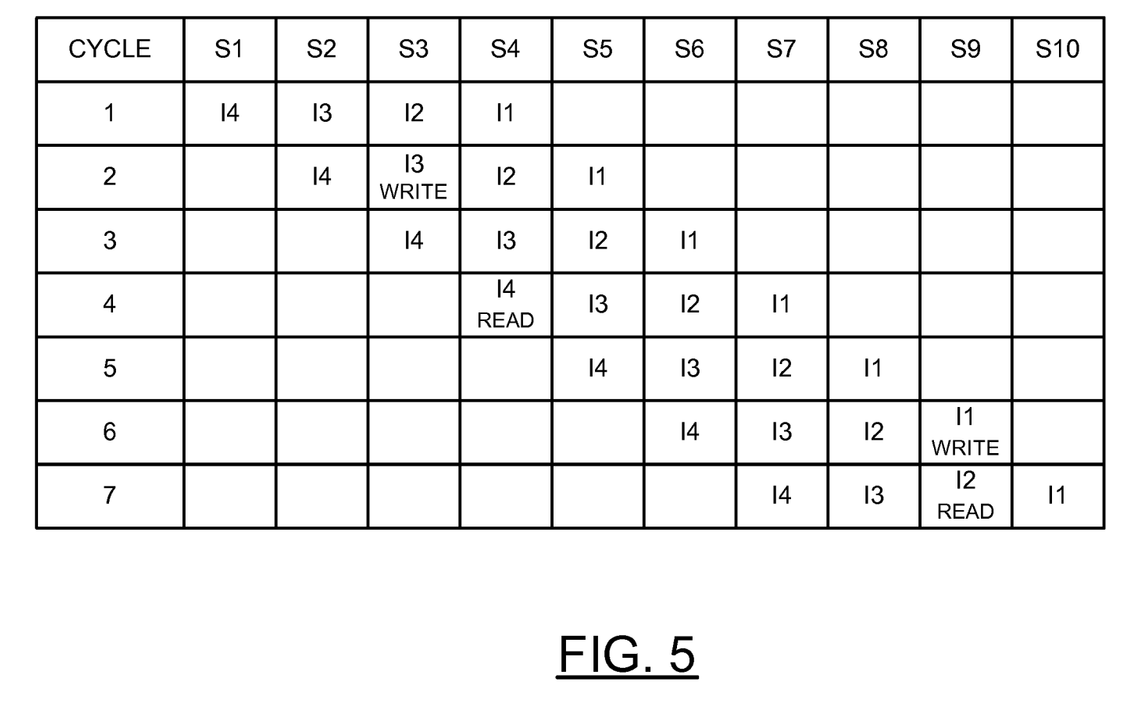
FIG. 5 is a diagram illustrating an example flow of several instructions through several pipeline stages.

Referring to FIG. 5, a diagram illustrating an example flow of several instructions through several pipeline stages of the circuit 106 is shown. The example generally illustrates the conditions shown in FIG. 2 where the instruction I1 writes to a resource X from stage S9, the instruction I2 reads the resource X at stage S9, the instruction I3 writes to same resource X from stage S3 and the instruction I4 reads the resource X at stage S4.

When the instruction I1 is copied into the pipeline in the circuit 106, the circuit 104 may detect the write to resource X at the stage S9 per step 124 (G=N=9). The circuit 104 may obtain a copy of the instruction I2 in the step 128. Steps 130 and 132 generally determine that instructions I1 and I2 do not cause a read-after-write conflict because instruction I2 reads from the resource X in cycle 7, which is after instruction I1 writes to the resource in cycle 6. The counter variable G may be decremented from 9 to 8 the step 136 and the instruction I3 may be obtained from the circuit 102 in the step 128. The circuit 104 may detect that instruction I3 is a write to the resource X at stage S3, which is before stage S9. Therefore, the circuit 104 may conclude in step 130 that instruction I1 is not involved in any read-after-write conflicts for the resource X even though instruction I4 would normally cause such a conflict.

When the instruction I3 is transferred to the circuit 106, the circuit 104 may detect the write to the resource X at the stage S3 per step 124 (G=N=3). Steps 130 and 132 may determine that the instruction I4 does not cause a read-after-write conflict with the instruction I3 because the instruction I4 reads the resource X in cycle 4, which is well after instruction I3 writes to the resource X in cycle 2. Due to the operations of the circuit 104, the circuit 106 may not be stalled for the three cycles as shown in FIG. 2, resulting in better processing efficiency.

Figure 6:
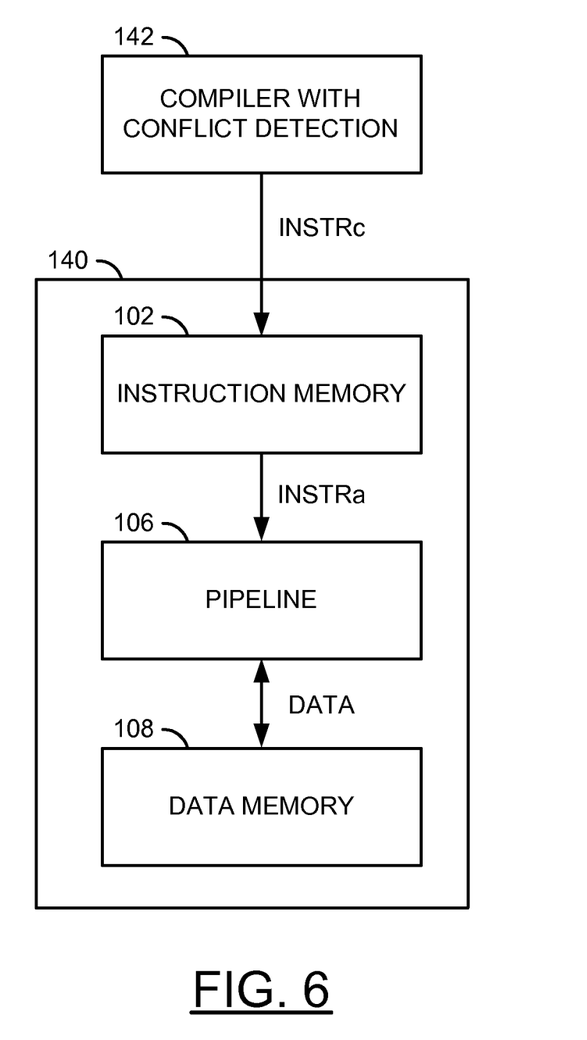
FIG. 6 is a diagram of an example implementation of a device and a compiler.

Referring to FIG. 6, a diagram of an example implementation of a device 140 is shown. The device (or apparatus) 140 may implement a pipelined processor. In some embodiments, the device 140 may implement an exposed pipelined processor. The device 140 generally comprises the circuit 102, the circuit 106 and the circuit 108. A circuit (or module) 142 may be in communication with the device 140 through a signal (e.g., INSTRc). The circuit 142 may represent a module and/or block that may be implemented as hardware, firmware, software, a combination of hardware, firmware and/or software, or other implementations.

The circuit 142 may implement a compiler circuit with a conflict detection capability. The circuit 142 is generally operational to perform the method 120 and adjust the sequence of instructions accordingly to resolve conflicts before the instructions are stored in the circuit 102. In some embodiments, the conflicts may be read-before-write resource conflicts. The conflicts may be resolved by inserting no-operation (NOP) instructions into the instruction schedule in step 134, rather than stalling the read instructions in the circuit 106.

Figure 7:
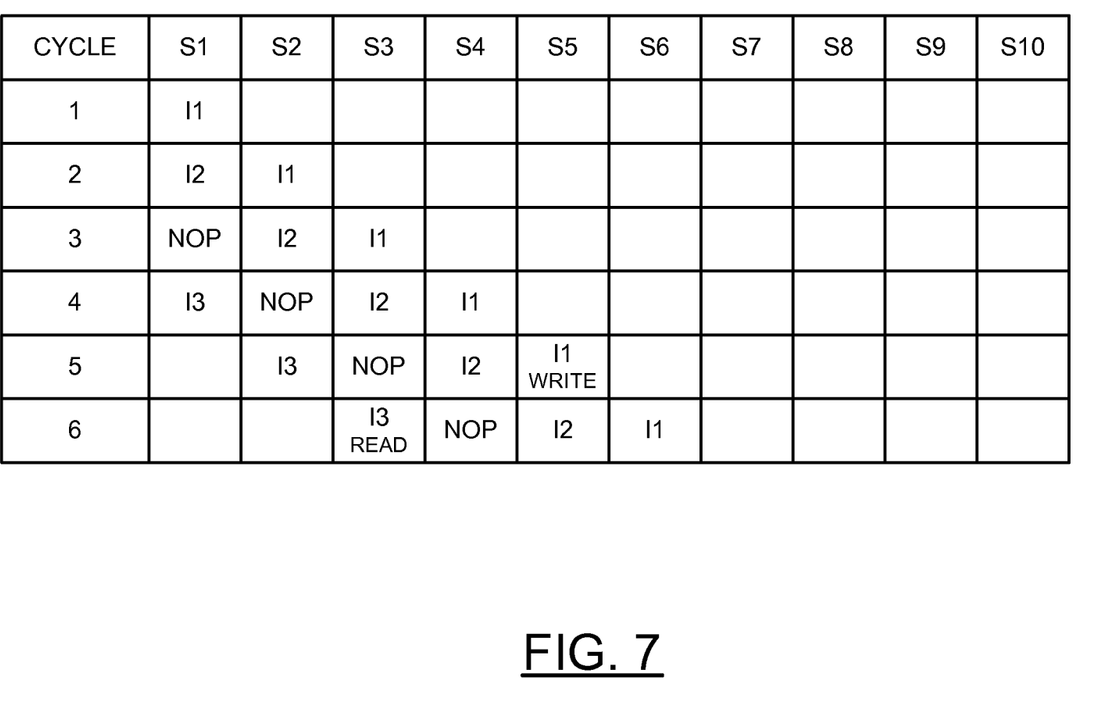
FIG. 7 is a diagram illustrating another example flow of several instructions through several pipeline stages.

Referring to FIG. 7, a diagram illustrating another example flow of several instructions through several pipeline stages of the circuit 106 is shown. The example generally illustrates the same conditions as in FIG. 1, where the instruction I1 writes to a resource X from stage S5, and instruction I3 reads from the resource X at stage S3.

When instruction I1 is detected by the circuit 142 per step 124, the circuit 142 may detect a write to the resource X from the stage S5 (G=N=5). The instruction I2 may be subsequently examined by the circuit 142. Steps 130 and 132 generally determine that instruction I2 is not involved in a read-before-write resource conflict with instruction I1. Therefore, step 136 may reduce the counter variable G from 5 to 4. Instruction I3 may be subsequently examined by the circuit 142. Step 132 may determine that a read-after-write conflict for resource X exists between instructions I1 and I3. Step 134 may calculate that a single cycle delay of instruction I3 may resolve the conflict. Therefore, the circuit 142 may insert a NOP instruction between the instruction I2 and I3 in the step 134. As illustrated in FIG. 7, when instruction I1 writes to the resource X from stage S5 in cycle 6 the instruction I3 is still in stage S2. When instruction I3 reaches stage S3 in cycle 6, the data written by instruction I1 is ready and available without any further delay.

Where the circuit 142 encounters the situation of FIG. 2, the results may be the same as illustrated in FIG. 5. The situation of FIG. 2 has instruction I1 writing to the resource X from stage S9, instruction I2 reading the resource X from stage S9, instruction I3 writing to the resource X from stage 53 and instruction I4 reading the resource X from stage 54. The circuit 142 may respond to the instructions I1 to I4 similar to the response of the circuit 104. By following the method 120, the circuit 142 may determine that (i) no read-after-write conflict exists between the instructions I1 and I2, (ii) instruction I3 negates any further read-after-write conflicts for the instruction I1 and (iii) no read-after-write conflict exists between the instructions I3 and I4. Therefore, the circuit 142 does not insert any NOP instructions in the sequence of instructions I1 to I4.

The functions performed by the diagrams of FIGS. 3, 4 and 6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a processor having a pipeline; and
a circuit configured to (i) detect a first write instruction in said pipeline that writes to a resource, (ii) stall a read instruction in said pipeline where (a) a first read-after-write conflict exists between said first write instruction and said read instruction and (b) no other write instruction to said resource is scheduled between said first write instruction and said read instruction and (iii) not stall said read instruction where (a) said first read-after-write conflict exists and (b) a second write instruction to said resource is scheduled between said first write instruction and said read instruction.

2. The apparatus according to claim 1, wherein said circuit is further configured to examine a determined number of subsequent instructions scheduled after said first instruction.

3. The apparatus according to claim 2, wherein said circuit is further configured to cancel said first read-after-write conflict in response to finding said second write instruction among said subsequent instructions.

4. The apparatus according to claim 2, wherein said determined number matches a stage number in said pipeline where said first instruction writes to said resource.

5. The apparatus according to claim 1, wherein said second write instruction writes to said resource before said read instruction reads from said resource.

6. The apparatus according to claim 1, wherein said first write instruction writes to said resource at a particular stage of said pipeline.

7. The apparatus according to claim 6, wherein (i) said read instruction reads from said resource at a given stage of said pipeline and (ii) said given stage is earlier in said pipeline than said particular stage.

8. The apparatus according to claim 6, wherein (i) said second write instruction writes to said resource at a given stage of said pipeline and (ii) said given stage is earlier in said pipeline than said particular stage.

9. The apparatus according to claim 1, wherein said circuit is further configured to check for a second read-after-write conflict between said second write instruction and said read instruction.

10. The apparatus according to claim 1, wherein said pipeline is an interlocked pipeline.

11. A method for eliminating read-after-write conflicts in a processor, comprising the steps of:
   (A) detecting a first write instruction in a pipeline of said processor that writes to a resource;
   (B) stalling a read instruction in said pipeline where (i) a first read-after-write conflict exists between said first write instruction and said read instruction and (ii) no other write instruction to said resource is scheduled between said first write instruction and said read instruction; and
   (C) not stalling said read instruction where (i) said first read-after-write conflict exists and (ii) a second write instruction to said resource is scheduled between said first write instruction and said read instruction.

12. The method according to claim 11, further comprising the step of:
   examining a determined number of subsequent instructions scheduled after said first instruction.

13. The method according to claim 12, further comprising the step of
   canceling said first read-after-write conflict in response to finding said second write instruction among said subsequent instructions.

14. The method according to claim 12, wherein said determined number matches a stage number in said pipeline where said first instruction writes to said resource.

15. The method according to claim 11, wherein said second write instruction writes to said resource before said read instruction reads from said resource.

16. The method according to claim 11, wherein said first write instruction writes to said resource at a particular stage of said pipeline.

17. The method according to claim 16, wherein (i) said read instruction reads from said resource at a given stage of said pipeline and (ii) said given stage is earlier in said pipeline than said particular stage.

18. The method according to claim 16, wherein (i) said second write instruction writes to said resource at a given stage of said pipeline and (ii) said given stage is earlier in said pipeline than said particular stage.

19. The method according to claim 11, further comprising the step of:
   checking for a second read-after-write conflict between said second write instruction and said read instruction.

20. A method for eliminating read-after-write conflicts in a processor, comprising the steps of:
   (A) detecting a first write instruction schedule in a pipeline of said processor that writes to a resource;
   (B) inserting one or more no-operation instructions before a read instruction where (i) a first read-after-write conflict exists between said first write instruction and said read instruction and (ii) no other write instruction to said resource is scheduled between said first write instruction and said read instruction; and
   (C) not inserting said no-operation instructions before said read instruction where (i) said first read-after-write conflict exists and (ii) a second write instruction to said resource is scheduled between said first write instruction and said read instruction.

* * * * *